(12) United States Patent
Oliver et al.

(10) Patent No.: US 7,177,267 B2
(45) Date of Patent: Feb. 13, 2007

(54) HARDWARE MONITORING AND CONFIGURATION MANAGEMENT

(75) Inventors: Jeffrey Oliver, Tustin, CA (US); Lovlesh Tandon, San Dimas, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 928 days.

(21) Appl. No.: 10/008,657

(22) Filed: Nov. 9, 2001

(65) Prior Publication Data

US 2003/0091002 A1 May 15, 2003

(51) Int. Cl.
*G06F 11/30* (2006.01)

(52) U.S. Cl. .................. 370/216; 370/242; 370/252; 379/1.03; 709/224

(58) Field of Classification Search ............ 370/216, 370/241, 242, 252, 241.1, 217; 379/1.03
See application file for complete search history.

(56) References Cited

U.S. PATENT DOCUMENTS

| | | | |
|---|---|---|---|
| 3,996,423 A * | 12/1976 | Colton et al. ............... 370/242 |
| 4,672,537 A * | 6/1987 | Katzman et al. ............. 714/56 |
| 5,455,932 A * | 10/1995 | Major et al. ................ 711/162 |
| 5,491,796 A | 2/1996 | Wanderer et al. |
| 5,727,160 A * | 3/1998 | Ganesan et al. ............ 709/249 |
| 5,790,397 A | 8/1998 | Bissett et al. |
| 5,793,751 A | 8/1998 | Baker et al. |
| 5,909,480 A * | 6/1999 | Reynaud et al. ......... 379/15.01 |
| 5,946,373 A * | 8/1999 | Harris ...................... 379/14.01 |
| 6,167,179 A * | 12/2000 | Weiss et al. ................ 385/103 |
| 6,252,858 B1 * | 6/2001 | Inoue ......................... 370/254 |
| 6,414,595 B1 * | 7/2002 | Scrandis et al. ............ 340/506 |
| 6,425,006 B1 * | 7/2002 | Chari et al. ................. 709/224 |
| 6,512,774 B1 * | 1/2003 | Vepa et al. ................. 370/401 |
| 6,578,086 B1 * | 6/2003 | Regan et al. ............... 709/242 |
| 6,687,749 B1 * | 2/2004 | Chavez et al. ............. 709/223 |
| 6,816,461 B1 * | 11/2004 | Scrandis et al. ............ 370/242 |

* cited by examiner

*Primary Examiner*—Hassan Kizou
*Assistant Examiner*—Brian Roberts
(74) *Attorney, Agent, or Firm*—Fogg and Associates LLC; J. Patrick Kendrick

(57) ABSTRACT

A transmission system is provided. The system includes a hardware monitor adapted to collect performance information about associated hardware components, a system information database adapted to refresh based on the collected performance information and to generate system status information, and a hardware controller adapted to selectively communicate alarm change messages to one or more of the hardware components based on the collected performance information and the system status information.

25 Claims, 4 Drawing Sheets

HARDWARE MONITORING AND CONFIGURATION MANAGEMENT

TECHNICAL FIELD

The present invention relates generally to the field of electronics and, in particular, to the control and management of transport hardware.

BACKGROUND

With the introduction of high-speed voice and data transmission the demand for management of transport hardware within telecommunications systems has significantly increased. As programmers work to reduce overhead, increase memory and increase the functionality of system operations line cards associated with the telecommunication systems have become more and more complex. Currently when a change to a particular piece of hardware on or associated with a line card is required a function on one of many modules on the board interrogates all of the different pieces of configuration. The function determines whether or not things have changed in the hardware and whether or not things in the hardware need to be changed. The function then proceeds to reconfigure all pieces of the system. These operations are not only inefficient but require a significant amount of overhead and memory.

For the reasons stated above, and for other reasons stated below which will become apparent to those skilled in the art upon reading and understanding the present specification, there is a need in the art for improvements in the management of transport hardware in telecommunications systems and various types of hardware in other systems.

SUMMARY

The above mentioned problems with the management of hardware in systems such as telecommunications systems and other problems are addressed by embodiments of the present invention and will be understood by reading and studying the following specification.

In one embodiment, a transmission system is provided. The system includes a hardware monitor adapted to collect performance information about associated hardware components, a system information database adapted to refresh based on the collected performance information and to generate system status information, and a hardware controller adapted to selectively communicate alarm change messages to one or more of the hardware components based on the collected performance information and the system status information.

In one embodiment, a local transmission system is provided. The system includes a detection device adapted to identify alarm information within the local transmission system and to identify received alarm information from one or more associated remote units and a system information database adapted to store system status information and to refresh based on alarm information identified by the detection device. The system further includes a hardware controller adapted to selectively communicate alarm change messages to one or more hardware components based on the alarm information and the system status information.

In one embodiment, a method of hardware management is provided. The method includes receiving notification of a change in alarm state from a remote unit of a transmission system, storing the change in alarm state information in a system information database, and distributing an alarm change message to a hardware controller. The method further includes receiving the alarm change message and querying the database as to which state the alarm is in currently, and changing the current hardware configuration via associated hardware drivers.

In another embodiment, a method of hardware management for a transmission system is provided. The method includes detecting an alarm indication, performing information calculations on the alarm indication, and refreshing an associated system information database with the information calculations and the alarm indication. The method further includes distributing an alarm change message to a hardware controller and a notification device, receiving the alarm change message and determining the hardware to be changed based on the alarm change message and the current state of the associated alarm, and requesting a change to the current configuration of hardware via hardware drivers.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a system and method that acts as a governing body over hardware in a transmission system. The system and method is implemented in various parts and system levels (e.g. software, firmware, hardware and the like) to include a hardware controller and a hardware monitor. The hardware controller reacts to alarms from hardware. The hardware monitor collects performance information about the hardware. In one embodiment, the hardware controller and the hardware monitor comprise a module. The module acts as an interface between an associated database and the hardware. In one embodiment, the module provides a transport hardware controller and a transport hardware monitor for a telecommunications transmission system (e.g. DSL, HDSL, xDSL line cards or the like). In one embodiment, the transmission system design complies with the G.SHDSL requirements for the transmission and multiplexing of data over a single pair of wires.

Embodiments of the present invention provide a monitoring and control system for hardware that is expandable, flexible and modular. It allows the expansion in the number of hardware ports that can be implemented with ease. For example to expand from one digital subscriber line port to two digital subscriber line ports all that is required is a change to an identification number in the program. The system updates with two digital subscriber line ports and operates from there. The number of controllers within a system is expandable by simply attaching additional controllers. The additional controllers communicate their existence and the system configures operation with the additional controllers.

Figure 1:
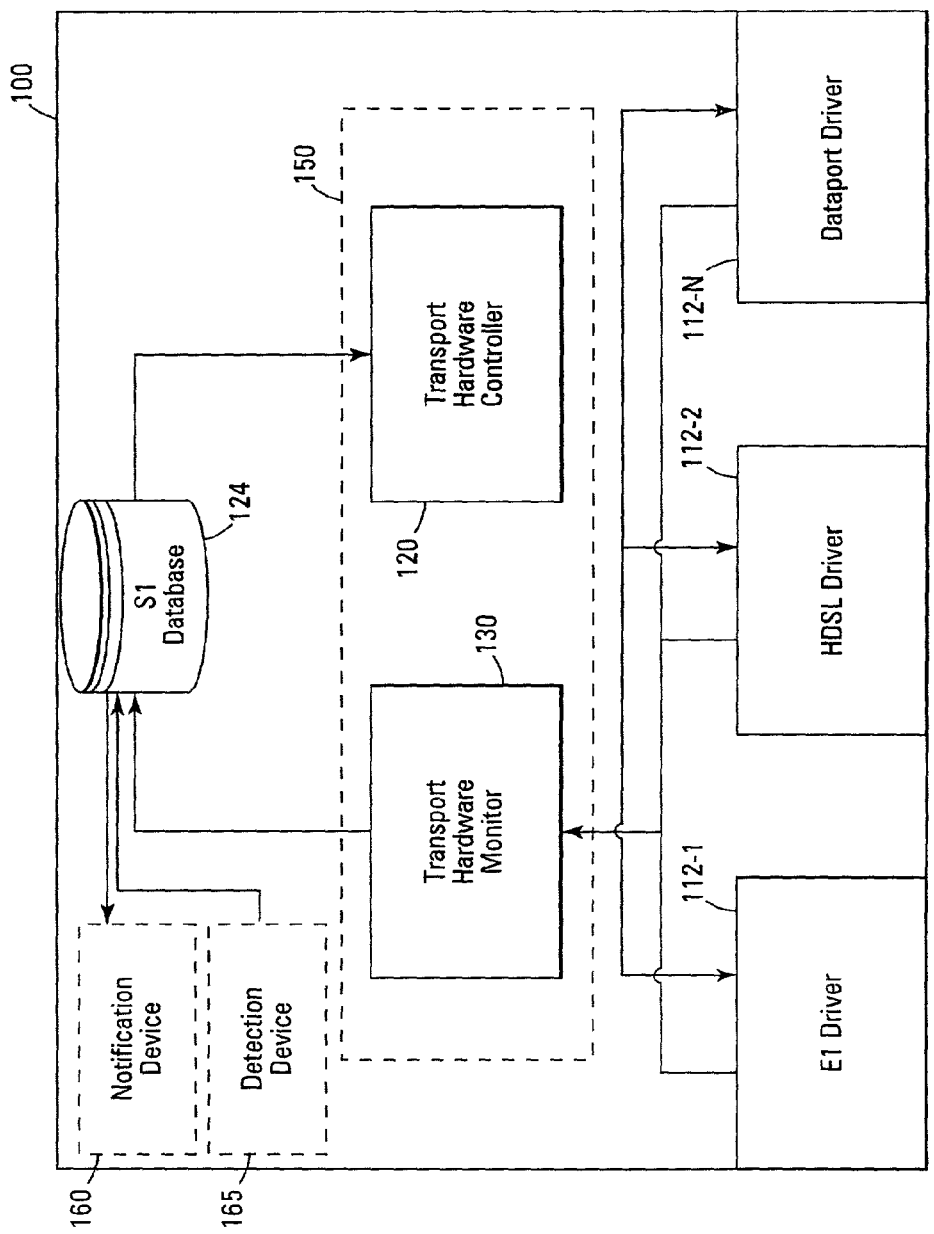
FIG. 1 is a block diagram of one embodiment of a system for controlling and monitoring hardware in a transmission system according to the teachings of this invention

FIG. 1 is a block diagram of one embodiment of a system for controlling and monitoring hardware in a transmission system, shown generally at 100, according to the teachings of this invention. System 100 includes a system information (SI) database 124 coupled between a hardware monitor 130 and a hardware controller 120. Hardware controller 120 is adapted to communicate with one or more hardware drivers 112-1 to 112-N.

In one embodiment, hardware controller 120 and hardware monitor 130 comprise a hardware module 150. Module 150 is the governing body over the system hardware (e.g. E1, DSL, Dataport). Hardware controller 120 reacts to alarms from the associated hardware and hardware monitor 130 collects performance information about the associated hardware. Module 150 is the interface between SI database 124 and any associated hardware. In one embodiment, the associated hardware comprises transport hardware such as E1/T1 port, digital subscriber line port, serial dataport, or the like. In another embodiment, the associated hardware further includes light emitting diode port, power feed control, or the like.

Module 150 is adapted to operate with various types of transmission systems having one or more application modes. For example a telecommunications transmission system (e.g. providing DSL, HDSL, xDSL) consisting of a line card providing one or more of E1, DSL, serial data transmission, or the like.

Hardware monitor 130 is implemented as a task responsible for periodically checking the various hardware components for state changes. In one embodiment, hardware monitor 130 checks for alarms or error counts and keeps the unit's SI database 124 refreshed. In one embodiment, SI database 124 accumulates each of the error counts for a 24 hour and 7 day history and the alarms are recorded as first and last occurrence. In other embodiments, SI database 124 accumulates error counts and records alarms based on user requirements. In one embodiment, hardware monitor 130 calculates performance statistics and generates alarms for each of the ports in the system. Hardware monitor 130 is programmable to provide statistics and information about system operations as well as generate signals based on user requirements.

In operation, transport hardware controller 120 is responsible for reacting to changes that occur in SI database 124. Transport hardware controller 120 reacts to various alarms (remote loss of signal (RLOS), loss of sync word (LOSW), power feed short (PFS), and the like.) Transport hardware controller 120 causes changes to associated hardware based upon a change in SI database 124 using appropriate hardware driver(s) 112-1 to 112-N.

Transport hardware monitor 130 and transport hardware controller 120 work closely together to make a system such as a transmission system work. In one embodiment, they are not implemented in the same task and there is not direct connection between hardware monitor 130 and hardware controller 120. Transport hardware monitor 130 and transport hardware controller 120 use SI database 124 to facilitate communication between them. For example when the hardware needs to react to alarm events, SI database 124 is updated with the new alarm indications and the associated hardware changes its current configuration.

Transport hardware monitor 130 is implemented as a group of periodic events. Transport hardware monitor 130 queries various hardware components (e.g. drivers 112-1 to 112-N) for the current status.

In current systems, the hardware controller has to poll the database for changes in configuration. Embodiments of the present invention include hardware monitor 130 that monitors the hardware and refreshes SI database 124 which in turn send messages to the hardware controller 120 indicating current alarms and/or detected errors in the system. As a result the amount of overhead required to manage the hardware in a system is significantly reduced. In addition, having hardware management implemented in multiple defined parts to include the hardware monitor 130 and hardware controller 120 which interface via SI database 124 makes management of hardware in the system easier to understand.

In one embodiment, system 100 further includes a notification device 160 adapted to transmit collected performance information and system status information to one or more associated remote units. In another embodiment, system 100 further includes detection device 165 adapted to identify alarm information received from one or more associated remote units. In one embodiment, notification device 160 is an embedded operations channel. In one embodiment, detection device 165 is an embedded operations channel.

Figure 2:
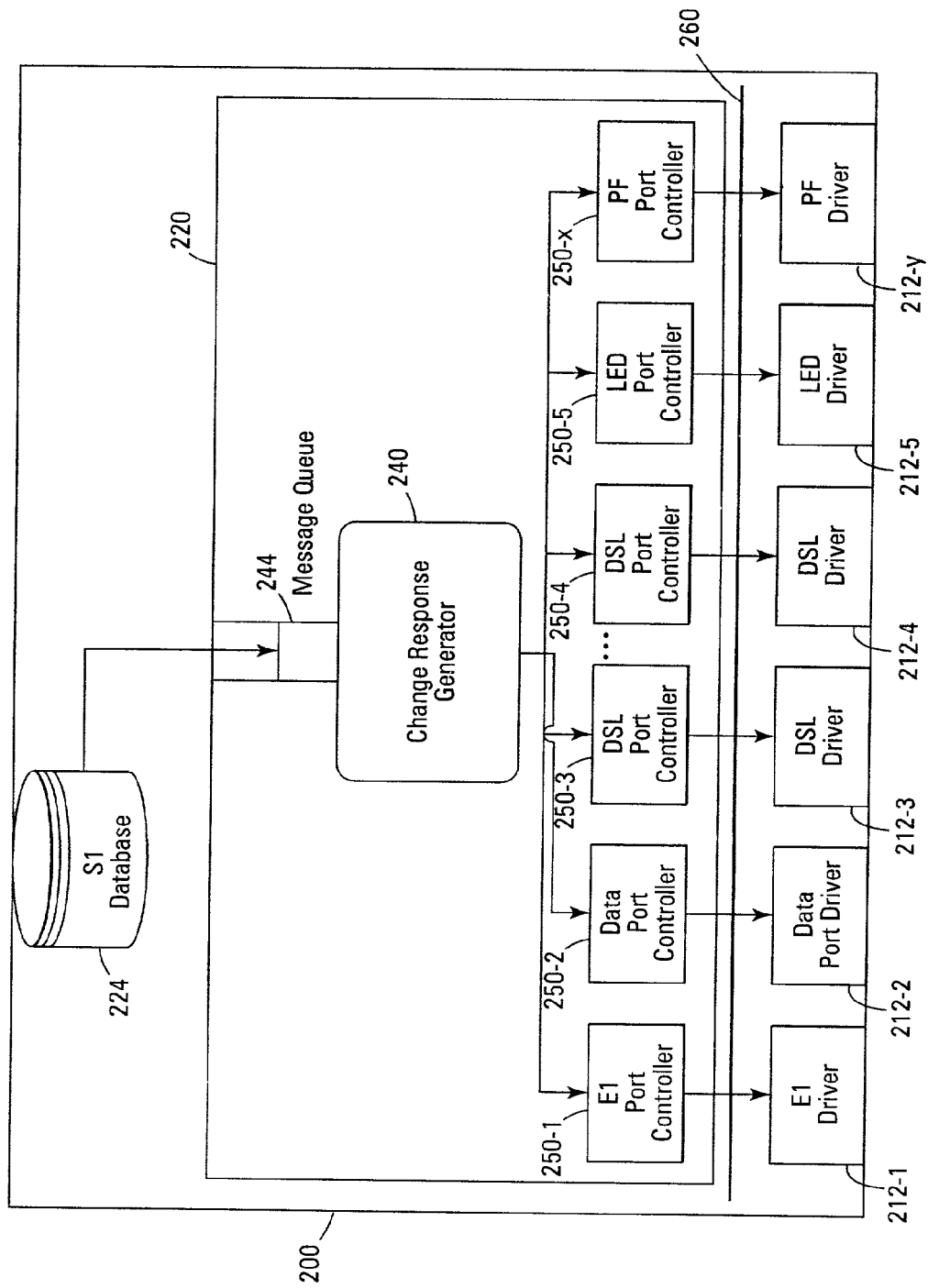
FIG. 2 is block diagram of one embodiment of a system including a hardware controller according to the teachings of the present invention.

FIG. 2 is one embodiment of a block diagram of a system, shown generally at 200, including a hardware controller according to the teachings of the present invention. System 200 includes a system information database 224 coupled to a hardware controller 220. Hardware controller 220 includes a change response generator 240 coupled to one or more hardware port controllers 250-1 to 250-X. Hardware port controllers 250-1 to 250-X communicate with port drivers 212-1 to 212-Y via application interface (API) 260.

In operation, hardware controller 220 is implemented as a task which pends on message queue 244. SI database 224 determines that an element in database 224 has changed and notifies hardware controller 220. Message queue 244 collects messages that are received from SI database 224 regarding which part of database 224 has changed so that associated hardware can be changed accordingly. SI database 224 also insures that multiple instances of the same message do not get posted to hardware controller 220. For example, SI database 224 receives information from one or more devices that monitor alarms and determine the status of associated hardware. SI database 224 compares the received information to the current information stored in SI database 224 and provides messages to hardware controller 220 only when a change in an associated hardware has occurred. In one embodiment, message queue 244 is the single interface into hardware controller 220. When a message is posted to message queue 244, the user causes hardware controller 220 to execute. In one embodiment, SI database 224 is the only module that can post messages to hardware controller 220.

Many different messages can be posted to message queue 244. Each of the messages notify hardware controller 220 that a change in an associated system has occurred. In one embodiment, there are two types of messages:

1. Notification of a change in state of an alarm; and
2. Notification of a change in configuration.

Each of these messages is posted to the same message queue 244 to be processed by hardware controller 220. In one embodiment, messages sent by SI database 224 to hardware controller 220 consist of a database element identification (ID) of the configuration object that has changed or the specific alarm ID that has changed state, along with the location of the change. In one embodiment, where system 200 operates to control transport hardware in a telecommunications system the location of the change would be a local or remote unit. Table 1 below includes a list of possible messages for alarm notification for one embodiment of a telecommunications transmission system supporting E1/T1 and/or serial data over DSL. Table 2 below includes a list of possible messages for configuration notification for one embodiment of a telecommunications transmission system supporting E1/T1 and/or serial data over DSL.

TABLE 1

Alarm Notification Messages

| Alarm Notify Message | Description |
| --- | --- |
| SI_E1_ALARM_VECTOR_ID | Indicates a change in state of any E1 alarm. |
| SI_E1_LOS_ALM_ID | Indicates a change in state in a Local Loss of Signal alarm (E1). |
| SI_E1_LFA_ALM_ID | Indicates a change in state in a Loss of Frame Alignment alarm (E1). |
| SI_E1_RAI_ALM_ID | Indicates a change in state in a Remote Alarm Indication alarm (E1). |
| SI_E1_AIS_ALM_ID | Indicates a change in state in an Alarm Indication Signal alarm (E1). |
| SI_N64K_ALARM_VECTOR_ID | Indicates a change in state of any dataport alarm. |
| SI_N64K_LOC_ALM_ID | Indicates a change in state in a Loss of Clock alarm. |
| SI_E1_LAST_24HR_ID | Indicates the detection of an ES on the application port (E1). |
| SI_DSL_LINK_STATUS_ID | Indicates a change in state of the DSL loop status (DSL). |
| SI_DSL_ALARM_VECTOR_ID | Indicates a change in state of any DSL alarm. |
| SI_DSL_LOSW_ALM_ID | Indicates a change in state in a Loss of Sync Word alarm (DSL). |
| SI_DSL_MAR_ALM_ID | Indicates a change in state in a Margin alarm (DSL). |
| SI_DSL_ES_ALM_ID | Indicates a change in state in an Errored Second Threshold alarm (DSL). |
| SI_DSL_LA_ALM_ID | Indicates a change in state in the Loop Attenuation alarm (DSL). |
| SI_DSL_PFS_ALM_ID | Indicates a change in state in a Power Feed Short alarm. |
| SI_DSL_LAST_24HR_ID | Indicates the detection of an ES on the DSL port (DSL). |
| SI_CHANNEL_STATUS_ID | Indicates a change in the channel's status. |
| SI_LOOP_REV_ID | Indicates the loops of a system are reversed. |
| SI_CLK_STATE_ID | Indicates a change in the activity of each of the master clock sources. |

TABLE 2

Configuration Notification Messages

| Config Notify Message | Description |
| --- | --- |
| SI_LPBK_POS_ID | Indicates a change in loopback configuration (position, direction). |
| SI_BERT_STATE_ID | Indicates a change in bit error rate testing configuration. |
| SI_DSL_LINE_RATE_ID | Indicates a change in DSL rate (in number of timeslots). |
| SI_PRIMARY_TIMING_ID | Indicates a change in the primary timing source. |
| SI_BACKUP_TIMING_ID | Indicates a change in the secondary timing source. |
| SI_E1_NUM_TS_ID SI_E1_BEGIN_TS_ID | Indicates a change in the timeslot assignment for the E1 port |
| SI_CRC4_MODE_ID | Indicates a change in the E1 port's CRC4 mode. |
| SI_CAS_MODE_ID | Indicates a change in the E1 port's CAS mode. |
| SI_E1_IDLE_CODE_ID | Indicates a change in the E1 port's idle code. |
| SI_AIS_MODE_ID | Indicates a change in the E1 port's AIS mode. |
| SI_N64K_INTERFACE_ID | Indicates a change in the N64K port's interface setting. |
| SI_N64K_NUM_TS_ID SI_N64K_BEGIN_TS_ID | Indicates a change in the timeslot assignment for the N64K port. |
| SI_N64K_TX_CLK_ID | Indicates a change in the TX clock selection. |
| SI_CTS_CTRL_ID | Indicates a change in the CTS control selection. |
| SI_DSR_CTRL_ID | Indicates a change in the DSR control selection. |
| SI_RLSD_CTRL_ID | Indicates a change in the RLSD control selection. |
| SI_LLRL_CTRL_ID | Indicates a change in the LL/RL control selection. |

For example a message ID: SI_E1_ALARM_VECTOR_ID is an indicator of a change in state of any E1 alarm and controllers for E1, Dataport, DSL and LED are notified. The purpose of this alarm is to update a transmission system at both a local and remote location on any change in the state of alarms.

For example a message ID: SI_BERT_STATE_ID configures the hardware to facilitate a bit error rate test. In this embodiment, controllers for E1, Dataport and DSL are notified. As a result of this configuration notification the bit error rate testing portions of the hardware will be setup to facilitate testing, pseudo-random bit sequence generators will be started and mapped into the data stream, and meters will measure the number of bit errors during the test interval.

Configuration changes occur from different sources in the associated transmission system. As the configuration changes, the hardware needs to be configured accordingly. These configurations are based upon information stored in SI database 224. SI database 224 notifies hardware controller 220 of a change in configuration. Hardware controller 220 is comprised of a change response generator 240 and a plurality of hardware port controllers 250-1 to 250-X. As change response generator 240 receives a message from SI database 224 it generates a response appropriate for the particular ports that it controls. Each hardware port controller 250-1 to 250-X then creates the appropriate hardware response based upon the received database information change. Each hardware port controller 250-1 to 250-X has a set of functions to control them.

Change response generator 240 is responsible for creating a response to a configuration or alarm change on a port-by-port basis. This portion of hardware controller 220 takes a message from message queue 244 and generates an appropriate response for each of the attached port controllers 250-1 to 250-X. In one embodiment, when hardware controller 220 receives a remote loss of signal (RLOS) message, change response generator 240 will create and transmit port controller commands to E1 port controller 250-1 and data port controller 250-2. E1 port controller 250-1 and data port controller 250-2 will then appropriately deal with the received port controller commands. Change response generator 240 includes a table to keep all of the port responses for each of the possible database messages. In one embodiment, upon startup, the table is filled with information pertaining to the detected ports and pointers to functions that will cause a particular response to the incoming event for the assigned port.

In one embodiment, change response generator 240 includes an additional table to facilitate the sequencing of port responses. Depending on the message from SI database 224 change response generator 240 determines in which order to execute the responses for each of the associated ports. This table allows for each of the response sequences to have its own preset sequence. In one embodiment, a single port executes multiple responses for a single message. For example, it may be necessary to have E1port controller 250-1 execute a portion of a response, then have DSL port controller 250-3 execute a response, and E1 port controller 250-1 finish its response.

Each port controller 250-1 to 250-X is responsible for determining whether or not to carry out commands received from change response generator 240. In one embodiment, LED port controller 250-5 controls various LED's of a telecommunications line unit. LED port controller 250-5 responds to various events that occur in the system. LED port controller 250-5 registers its responses with change response generator 240, on startup and change response generator 240 generates responses for LED port controller 250-5.

Figure 3:
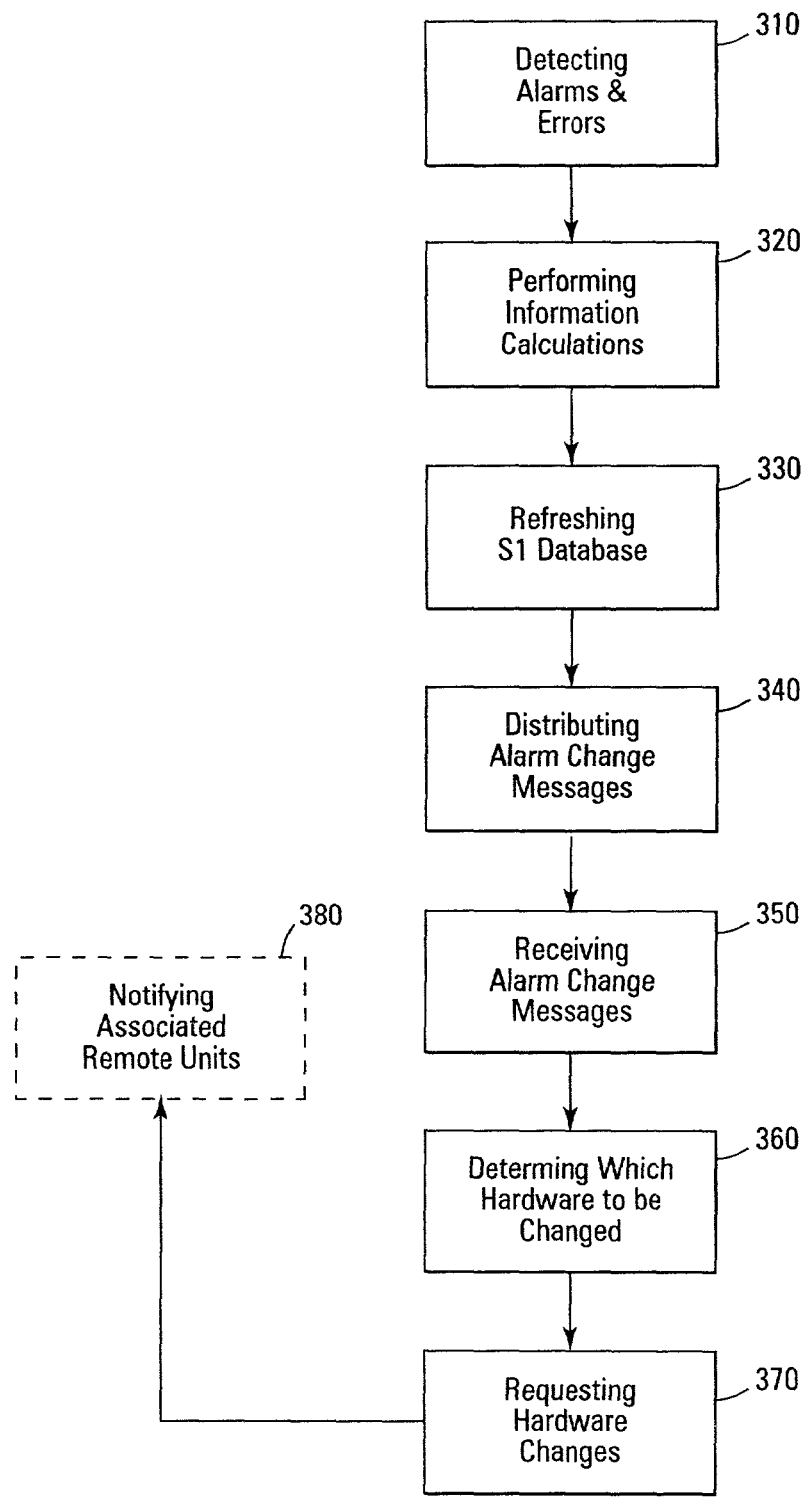
FIG. 3 is a flow chart of one embodiment of a method of hardware management for a transmission system according to the teachings of the present invention.

FIG. 3 is a flow chart of one embodiment of a method of hardware management for a transmission system, shown generally at 300, according to the teachings of the present invention. The method begins at block 310 and detects an alarm indication. In one embodiment, detecting an alarm indication comprises periodically checking hardware components for state changes. In another embodiment, detecting an alarm indication comprises checking hardware components for hardware alarms and error counts. In a further embodiment, detecting an alarm indication comprises detecting one or more of remote loss of signal, loss of sync word, power feed short, or the like. The method proceeds to block 320 and performs information calculations on the alarm indication. In one embodiment, performing information calculations on the alarm indication includes calculating performance statistics and generating alarms for each of the ports in the transmission system based on user-defined requirements.

At block 330 the method refreshes an associated system information database with the information calculations and the alarm indications. In one embodiment, refreshing an associated system information database with the information calculations and the alarm indication, includes passing the alarm indication and associated information calculations to the system information database, receiving the alarm indication and associated information calculations, and storing the current alarm indication and associated information calculation in one or more tables for subsequent retrieval. In one embodiment, storing the current alarm indication and associated information calculations comprises time stamping the current alarm indication.

The method proceeds to block 340 and distributes an alarm change message to one or more of a hardware controller and a notification device. In one embodiment, distributing an alarm change message to a hardware controller comprises posting the alarm change message to a message queue. In one embodiment, posting the alarm change message to a message queue causes the hardware controller to execute and queries the database as to the current system status and determines which hardware to be changed. At block 350 the alarm change message is received and at block 360 the hardware to be changed is determined based on the alarm change message and the current state of the associated alarm. In one embodiment, the hardware to be changed includes how to operate the system based upon the current system conditions on a port-by-port basis. The method proceeds to block 370 and changes to the current configuration of hardware are requested via associated hardware drivers.

In one embodiment, method 300 proceeds to block 380 and notifies one or more associated remote units of the change in alarm state. In another embodiment, method 300 includes accumulating error counts and recording alarm indications based on user-defined requirements. In one embodiment, accumulating and recording is performed by SI database.

Figure 4:
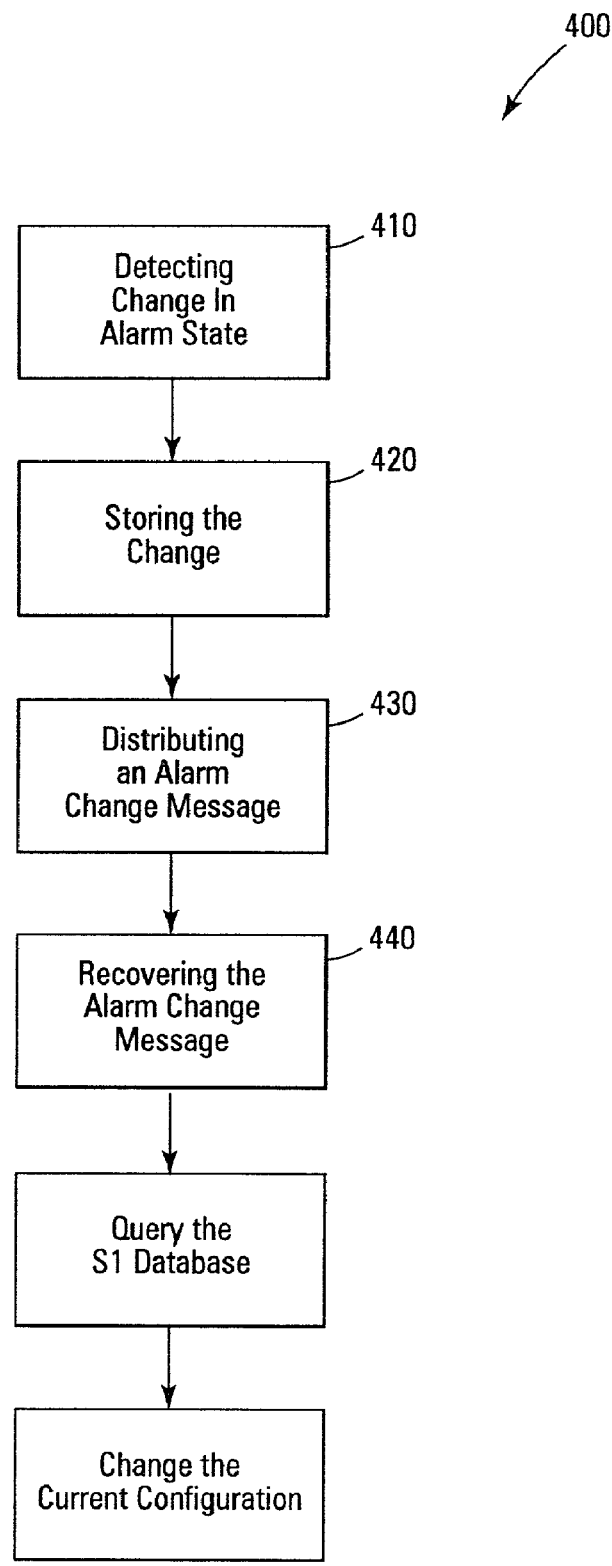
FIG. 4 is a flow chart of another embodiment of a method of hardware management for a transmission system according to the teachings of the present invention.

FIG. 4 is a flow chart of another method of hardware management for a transmission system, shown generally at 400, according to the teachings of the present invention. One or more remote units that have received notification of a change in alarm state execute method 400. At block 410, the method detects the change in alarm state. In one embodiment, detecting the change in alarm state includes detecting one or more of remote loss of signal, loss of sync word, power feed short, or the like. The method proceeds to block 420 and stores the change in alarm state information in a system information database. In one embodiment, storing the change in alarm state information comprises time stamping the current alarm indication. At block 430 the method distributes an alarm change message to a hardware controller and at block 440 the alarm change message is received. In one embodiment, the method posts the alarm change message to a message queue for processing. In one embodiment, posting the alarm change message causes the hardware controller to execute querying and changing the configuration. The method proceeds to block 450 and queries the database as to which state the alarm is in currently. At block 460 when required the current hardware configuration is changed via associated hardware drivers.

In one embodiment, method 400 further includes accumulating error counts and recording alarm indications based on user-defined requirements. In one embodiment, this information is stored in the SI database.

What is claimed is:

1. A transmission system, comprising:
   a hardware monitor adapted to collect performance information about associated hardware components;
   a system information database adapted to refresh based on the collected performance information and to generate system status information; and
   a hardware controller adapted to selectively communicate change messages to one or more of the hardware components based on the collected performance information and the system status information;
   wherein the hardware controller comprises:
   a change response generator; and
   one or more port controllers coupled to the change response generator, and wherein the change response generator includes a message queue adapted to receive alarm change messages generated by the system information database.

2. The system of claim 1, wherein the performance information includes alarm indications and error counts.

3. The system of claim 1, further comprising a notification device adapted to transmit collected performance information and system status information to one or more associated remote units.

4. The system of claim 3, wherein the notification device is an embedded operations channel.

5. The system of claim 1, wherein the one or more hardware components comprise one or more hardware drivers.

6. The system of claim 5, wherein the one or more hardware drivers comprise one or more of transport hardware drivers, a light emitting diode driver, and a power feed driver.

7. The system of claim 5, wherein the one or more hardware drivers comprise one or more of a digital subscriber line driver, an E1 driver, a dataport driver, a light emitting diode driver, and a power feed driver.

8. The system of claim 1, further comprising an application interface that interfaces between the hardware controller and the one or more hardware components.

9. A local transmission system, comprising:
a detection device adapted to identify alarm information within the local transmission system and to identify received alarm information from one or more associated remote units;
a system information database adapted to store system status information and to refresh based on alarm information identified by the detection device; and
a hardware controller adapted to selectively communicate change messages to one or more hardware components based on the alarm information and the system status information;
wherein the hardware controller comprises:
a change response generator; and
one or more port controllers coupled to the change response generator, and wherein the change response generator includes a message queue adapted to receive alarm change messages generated by the system information database.

10. The system of claim 9, wherein the alarm information includes alarm indications and error counts.

11. The system of claim 9, wherein the detection device is an embedded operations channel.

12. The system of claim 9, wherein the one or more hardware components comprise one or more hardware drivers.

13. The system of claim 9, wherein the one or more hardware drivers comprise one or more of transport hardware drivers, a light emitting diode driver, and a power feed driver.

14. A transmission system, comprising:
a system information database; and
a hardware module adapted to collect performance information about associated hardware components and to interface between the associated hardware components and the system information database;
wherein the system information database is adapted to refresh based on system performance information and to generate system status information;
wherein the hardware module selectively communicates change messages to one or more of the hardware components based on the collected performance information and the system status information; and
wherein the hardware module comprises:
a change response generator; and
one or more port controllers coupled to the change response generator, and wherein the change response generator includes a message queue adapted to receive alarm change messages generated by the system information database.

15. The system of claim 14, wherein the one or more hardware components comprise one or more hardware drivers.

16. The system of claim 15, wherein the one or more hardware drivers comprise one or more of transport hardware drivers, a light emitting diode driver, and a power feed driver.

17. The system of claim 14, wherein the performance information includes alarm indications and error counts.

18. A transmission system, comprising:
a system information database adapted to generate system status information;
a transport hardware monitor adapted to collect performance information about associated transport hardware components;
a transport hardware controller;
wherein the transport hardware controller selectively communicates with one or more hardware drivers to effect a configuration change based on the collected performance information and the system status information;
wherein the hardware monitor is adapted to query the one or more hardware drivers and to detect alarm conditions;
wherein the one or more hardware drivers are each adapted to communicate with the transport hardware controller via an application interface; and
wherein the transport hardware controller comprises:
a change response generator; and
one or more port controllers coupled to the change response generator, and wherein the change response generator includes a message queue adapted to receive alarm change messages generated by the system information database.

19. The system of claim 18, wherein the one or more hardware drivers comprise one or more of an E1 driver, a digital subscriber line driver, and a dataport driver.

20. A transmission system, the system comprising:
a hardware monitor adapted to collect performance information about associated hardware components;
a system information database adapted to refresh based on the collected performance information and to generate system status information; and
a hardware controller adapted to react to changes in the system information database by selectively communicating one or more change messages to one or more of the associated hardware components;
wherein the hardware controller comprises:
a change response generator; and
one or more port controllers coupled to the change response generator, and wherein the change response generator includes a message queue adapted to receive alarm change messages generated by the system information database.

21. The system of claim 20, wherein the one or more change messages are selectively communicated based on one or both of the collected performance information and the system status information.

22. The system of claim 20, wherein the one or more change messages are adapted to cause changes to the associated hardware components based upon a change in the system information database.

23. The system of claim 20, wherein the one or more hardware components comprise one or more hardware drivers.

24. A local transmission system, the system comprising:
- a detection device adapted to identify alarm information within the local transmission system and to identify received alarm information from one or more associated remote units;
- a system information database adapted to store system status information and to refresh based on alarm information identified by the detection device; and
- a hardware controller adapted to react automatically to changes in the system information database by selectively communicating one or more change messages to one or more associated hardware components;
- wherein the hardware controller comprises:
  - a change response generator; and
  - one or more port controllers coupled to the change response generator;
  - wherein the change response generator is adapted to react to changes in one or both of the alarm information and stored system status information by transmitting one or more port controller commands to the one or more port controllers; and
  - wherein the change response generator is adapted with a table to correlate one or more possible changes in the system information database with at least one associated port controller command of the one or more port controller commands.

25. The system of claim 24, wherein the one or more change messages are adapted to cause changes to the one or more associated hardware components based upon a change in the system information database.

* * * * *